April 11, 1944.   R. L. TEMPLIN   2,346,281
COMPRESSION PLATENS FOR MATERIALS TESTING MACHINES
Filed Jan. 23, 1942   2 Sheets-Sheet 1
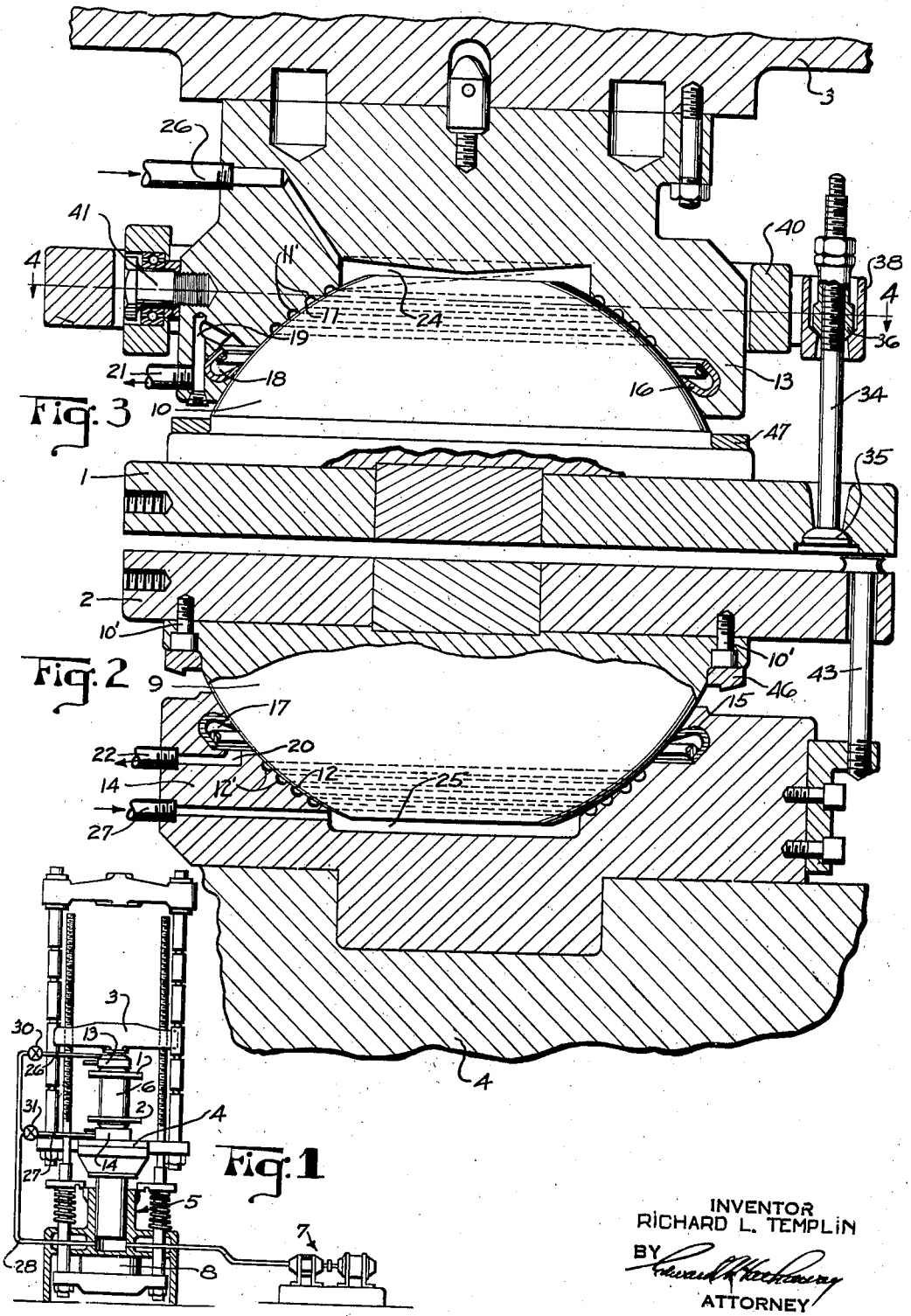
INVENTOR
RICHARD L. TEMPLIN
ATTORNEY April 11, 1944.  R. L. TEMPLIN  2,346,281

COMPRESSION PLATENS FOR MATERIALS TESTING MACHINES

Filed Jan. 23, 1942  2 Sheets-Sheet 2

INVENTOR
RICHARD L. TEMPLIN
BY
ATTORNEY

Patented Apr. 11, 1944

2,346,281

UNITED STATES PATENT OFFICE 2,346,281

COMPRESSION PLATEN FOR MATERIALS TESTING MACHINES

Richard L. Templin, New Kensington, Pa.

Application January 23, 1942, Serial No. 428,005

6 Claims. (Cl. 265—14)

This invention relates generally to materials testing apparatus and more particularly to apparatus for obtaining round end conditions in column testing.

In the testing of round end columns one of the most difficult problems to solve is the obtaining of truly round ends, that is, ends with absolutely no restraint to tipping and no eccentricity of loading. In view of the fact that the contact between the test column and testing machine loading platen constitutes a mechanical joint through which the column load is transmitted there is created some frictional resistance to the tipping of the ends of the specimen at failure.

Early attempts to obtain round end conditions for columns of large size were made using plain spherical seats or pins but this gave a condition quite close to fixed end columns. In other words, the amount of friction was almost sufficient to prevent any rotation of the ends of the specimen. Another attempt was to employ a spherical seat lined with small hardened steel balls but this device not only involved mechanical complications but was extremely limited in its maximum capacity. To overcome these prior art limitations other arrangements for obtaining the condition of round ends included knife edge fixtures and plates supported on ball bearing trunnions but these devices allowed tipping about only one axis, although heads that permit tipping in any direction use the intersecting knife edges or intersecting trunnions. Here again the capacity of such heads is usually small and the apparatus is subject to considerable elastic distortion during use.

It is an object of my invention to provide an improved apparatus that is highly effective in obtaining or approaching true round end conditions during column testing. A further object is to provide improved apparatus capable of accomplishing round end conditions during column testing through a wide range of loads and with a high loading capacity.

A still further object is to provide improved compression plates for a materials testing machine in which the plates are so constructed and arranged so as to have a high degree of sensitivity, accuracy and freedom of action combined with a high degree of ruggedness as well as being economical in operation and maintenance and relatively inexpensive consistent with the precision qualities and durability present in the apparatus.

Other objects and advantages will be more apparent to those skilled in the art from the following description of the accompanying drawings in which:

Fig. 1 is a diagrammatic outline of a testing machine embodying my improved column loading apparatus;

Figs. 2 and 3 are partial sectional views respectively of the lower and upper compression platens and supports therefor;

Figure 4:
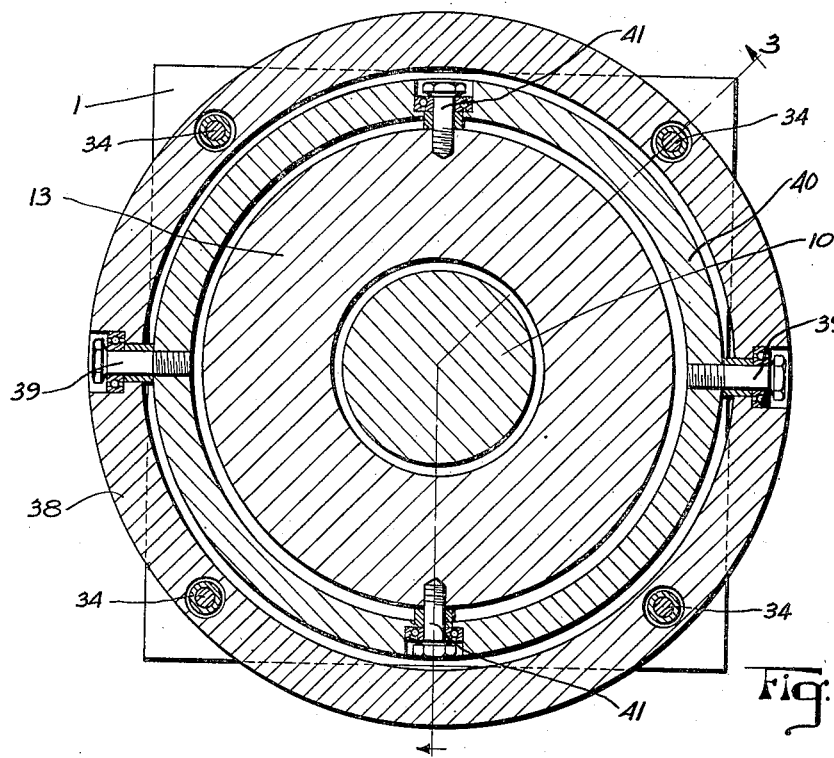
Fig. 4 is a section taken substantially on the line 4—4 of Fig. 3.
Figure 5:
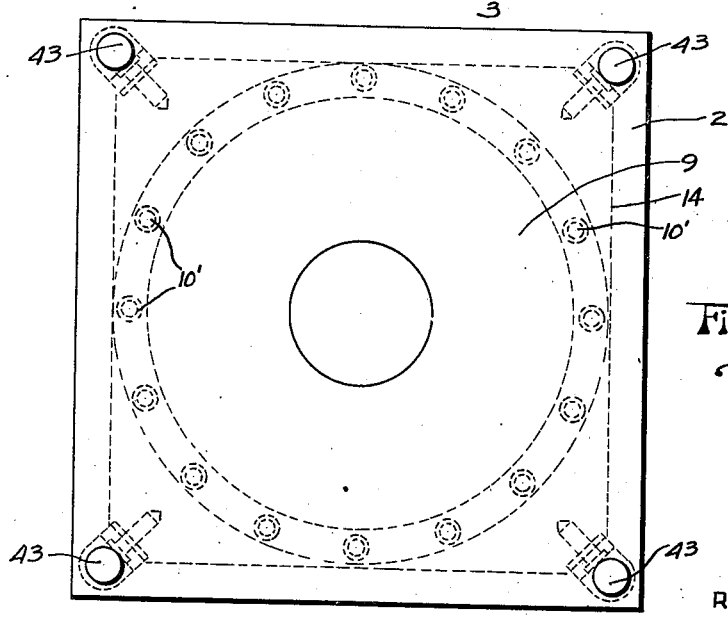
Fig. 5 is a plan view of the bottom compression plate.

In the drawings I have shown for purposes of illustration one form of my invention as used in actual practice. This comprises a pair of upper and lower compression heads including plates 1 and 2 respectively supported for spherical movement on a crosshead 3 and loading platform 4 of a usual testing machine. The machine is specifically shown herein as of the Emery type in which a hydraulic ram and cylinder 5 moves the loading platform 4 to compress a specimen 6 such as concrete, metal or other material. Fluid pressure for the loading cylinder 5 may be supplied from any suitable source such as motor driven pump unit 7 while the load on the specimen may be determined either by measuring the fluid pressure within the main cylinder 5 or by employing a suitable Emery type weighing capsule 8, although any other weighing system as well as any other type of testing machine may be employed. To permit the upper and lower ends of specimen 6 to have unrestricted spherical movement the compression plates 1 and 2 are floated on oil specifically supplied by the pump 7 which actuates the testing machine loading ram although in the case of screw type machines the pump 7 may be considered as an auxiliary pump for supplying the oil pressure on which the plates float. Each plate is provided with semi-spherical parts 9 and 10 secured thereto by studs 10'. These semi-spherical parts are fitted into seats 11 and 12 formed in bases 13 and 14, the semi-spherical parts and seats being ground and lapped together. Annular U-shaped washers 15 and 16 are disposed in suitable recesses 17 and 18 located near the base of the spherical parts 9 and 10. these recesses having leakage communication through ports 19 and 20 with suitable drainage pipes 21 and 22. To reduce leakage to a minimum while at the same time maintaining a continuous and uniform film of oil on which the spherical parts float, I provide the spherical seats with a series of annular labyrinth packing grooves 11' and 12' respectively.

To supply floating oil pressure to the spherical seats they are provided with chambers 24 and 25 located on the vertical axis, these chambers communicating through pipes 26, 27 and 28 with main cylinder 5 and pump 7 so that as loading pressure is increasingly applied to specimen 6 fluid pressure will be supplied to the spherical seats with a correspondingly increasing pressure thereby floating the spherical balls on a film of oil. The oil supply line 26 may be rigid while the pipe 27 may be of flexible tubing adapted to rise and fall with the loading platen 4. The cup washers 15 and 16 are of sufficient resiliency so that the sealing resistance is negligible.

Preferably a small amount of oil is allowed to seep out from between the lapped spherical surfaces during use thereby providing a continuously spreading film of oil which insures an oil cushion for the entire spherical surfaces and serves as a lubricant when there is relative movement between the spherical part and seat during round end testing of columns. Any seepage may be collected and returned to the oil supply tank of pump unit 7. The oil pressure drops from a maximum value in the reservoir chambers 24 and 25 to practically zero at the rim of the spherical surfaces near the packings 15 and 16. The flow of oil to each of the oil chambers 24 and 25 may be regulated by suitable needle valves diagrammatically indicated at 30 and 31, Fig. 1, these valves also serving to dampen or eliminate the possibility of oscillations of the specimen and both plates 1 and 2 caused by the pumping action of pump 7 or from self-induced vibration. The annular chambers containing the packings 15 and 16 are formed so that the free ends of the packings extend toward the small ends of the spherical parts 9 and 10. The labyrinth packing grooves cause oil to flow around the area of contact between the spherical surfaces, thus insuring a uniform thickness of oil film. Hence the possibility of lateral displacement of the platen and a non-uniform seepage of oil around the contacting surface of the packing 17 and 18 is eliminated.

The spherical surfaces are ground so that their centers lie in the specimen contacting face of plates 1 and 2 and hence the compression specimen pivots about centers lying in the end surfaces of the specimen thereby accomplishing the desired points of theoretical round end action.

To hold the upper plate 1 in its normal operative position against gravity while still allowing the plate to have complete freedom of action, a series of bolts 34 having lower spherical heads 35 and spherical nuts 36 are supported respectively in the plate 1 and an annular ring 38. This ring as shown in Fig. 4 is suitably supported by ball bearings on diametrically opposed pins 39 threaded into an inner annular ring 40 which, in turn, is pivotally supported through ball bearings on diametrically opposed pins 41 threaded into base 13 and angularly displaced 90 degrees from the axis of pins 39. This disposition of pins 39 and 41 permits universal movement of plate 1 and spherical part 10 while the nuts 36, Fig. 3, permit suitable axial adjustment of the ball to insure sufficient clearance for the oil film in the spherical seat. Thus the plate 1 and part 10 cannot fall away from base 13 when a specimen breaks or is not present in the machine. The lower compression plate 2 will normally remain in its seated position by gravity, although for purposes of lifting the plate 2 and base 14 on to or off of the testing machine a series of combined lifting and tie bolts 43 may be provided, these being removed during normal operation.

From the foregoing disclosure it is seen that I have provided improved compression heads adapted to minimize the possibility of frictional resistance to round end column testing and these heads have the further advantage of permitting all degrees of freedom of floating movement on an oil film whose pressure may increase in proportion to the increased load on a specimen whenever the fluid chambers 24 and 25 are connected directly to the testing machine loading cylinder 5, although when connected to an auxiliary pump the pressure may be controlled by needle valves 30 and 31. The improved structure and operation of my compression heads allows testing to very high loads without danger of increased friction and without limiting the freedom of spherical action on the heads, thereby providing a very effective, simple and direct manner of accomplishing round end testing of compression specimens. Annular rings 46 and 47, Figs. 2 and 3, preferably of soft metal, such as copper, are pressed on the spherical balls near their base thereby providing stops to limit the extent of tilting.

It will of course be understood that various changes in details of construction and arrangement of parts may be made by those skilled in the art without departing from the spirit of the invention as set forth in the appended claims.

I claim:

1. A compression head for round end testing of a compression specimen in a materials testing machine comprising, in combination, a base member having a spherical seat surface, a compression plate member having a part with a spherical surface for cooperation with said seat, liquid grooves disposed in the spherical surface of one of said members and encircling the axis thereof, and means connected to said seat so as to supply a film of liquid under continuous pressure between said part and its seat to provide a liquid floating spherical support for the end of a compression specimen.

2. A compression head for round end testing of a compression specimen in a materials testing machine comprising, in combination, a base having a spherical seat, a compression plate having a spherical part for cooperation with said seat, means for supplying a film of liquid under continuous pressure between said part and its seat to provide a liquid floating spherical support for the end of a compression specimen, sealing packing having a tapered sealing edge, and means whereby said packing is adapted to be interposed between said part and seat at a point near the base of the part with the taper extending toward the bottom end of the spherical seat and engageable with the spherical surface of the spherical part.

3. A compression head for round end testing of a compression specimen in a materials testing machine comprising, in combination, a base having a spherical seat, a compression plate having a spherical part for cooperation with said seat, means for supplying a film of liquid between said part and its seat to provide a floating spherical support for the end of a compression specimen, sealing packing interposed between said part and seat at a point near the base of the part, and a drainage port communicating with said packing, said packing being of annular U-shape with its edges directed toward the bottom end of the spherical seat thereby forming a seal for preventing seepage of the liquid flowing out along the seat.

4. A compression head for round end testing of a compression specimen in a materials testing machine comprising, in combination, a base member having a spherical seat surface, a compression plate member having a part with a spherical surface for cooperation with said seat, liquid grooves disposed in the spherical surface of one of said members and encircling the axis thereof, means for supplying liquid under continuous pressure to the bottom of said seat to form a film of liquid between said part and its seat to provide a liquid floating spherical support for the end of a compression specimen, and drainage means for liquid leakage near the large end of said spherical seat thereby to maintain a substantially uniform flow and film of oil between the part and its seat under the influence of said source of continuous pressure.

5. A compression head for round end testing of a compression specimen in a materials testing machine comprising, in combination, a base having a spherical seat, a compression plate having a spherical part for cooperation with said seat, means for supplying a film of liquid between said part and its seat to provide a floating spherical support for the end of a compression specimen, and universally jointed annular gimbal rings connecting said compression plate and base so as to prevent the plate and ball from falling out by gravity but still allowing the ball to have free movement in all degrees of direction.

6. A compression head for round testing of a compression specimen in a materials testing machine in which the specimen is loaded by a hydraulic pressure ram and cylinder comprising, in combination, a base having a spherical seat, a compression plate having a spherical part for cooperation with said seat, and means for supplying fluid from the hydraulic loading cylinder of the materials testing machine to said seat to form a film of liquid under continuous pressure between the seat and part thereby providing a liquid floating spherical support for the end of a compression specimen in which the supporting pressure of the liquid bears a relation to the loading force.

RICHARD L. TEMPLIN.

CERTIFICATE OF CORRECTION.

Patent No. 2,346,281.                                    April 11, 1944.

RICHARD L. TEMPLIN.

It is hereby certified that error appears in the printed specification of the above numbered patent requiring correction as follows: Page 3, second column, line 9, claim 6, after the word "round" insert --end--; line 22, same claim, after "liquid" insert --float--; and that the said Letters Patent should be read with this correction therein that the same may conform to the record of the case in the Patent Office.

Signed and sealed this 30th day of January, A. D. 1945.

(Seal)

Leslie Frazer
Acting Commissioner of Patents.